United States Patent
De Landa Magarin

(10) Patent No.: US 9,228,543 B2
(45) Date of Patent: Jan. 5, 2016

(54) ETHANOL PREHEATER FOR ENGINE

(71) Applicant: GRUPO GUASCOR S.L., Olean, NY (US)

(72) Inventor: Juan Jose Fernandez De Landa Magarin, Vitoria (ES)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/898,934

(22) Filed: May 21, 2013

(65) Prior Publication Data

US 2014/0060502 A1    Mar. 6, 2014

(30) Foreign Application Priority Data

May 24, 2012   (EP) ..................... 12382204

(51) Int. Cl.
*F02G 5/00*      (2006.01)
*F02M 31/00*     (2006.01)
*F02M 31/10*     (2006.01)

(52) U.S. Cl.
CPC ............... *F02M 31/00* (2013.01); *F02M 31/10* (2013.01); *Y02T 10/126* (2013.01)

(58) Field of Classification Search
CPC ..... F02M 53/02; F02M 53/06; F02M 31/125; Y02T 10/126; Y02T 10/121; F02D 41/062
USPC .......................... 123/557, 558, 543, 538, 1 A
See application file for complete search history.

(56) References Cited

U.S. PATENT DOCUMENTS

| | | | |
|---|---|---|---|
| 1,280,787 A | 10/1918 | McCurtain | |
| 3,448,733 A | 6/1969 | Aske | |
| 4,326,491 A * | 4/1982 | Burchett | F02M 31/16 123/552 |
| 4,350,133 A | 9/1982 | Greiner | |
| 4,380,975 A | 4/1983 | Powell | |
| 4,383,507 A | 5/1983 | Powell | |
| 4,438,749 A * | 3/1984 | Schwippert | 123/494 |
| 4,509,464 A * | 4/1985 | Hansen | F02B 1/02 123/1 A |
| 4,876,989 A * | 10/1989 | Karpuk | F02B 1/02 123/179.8 |
| 5,038,730 A | 8/1991 | Kashima | |

(Continued)

FOREIGN PATENT DOCUMENTS

DE    3501183 A1    6/1986
GB    2272729 A     5/1994

OTHER PUBLICATIONS

EP 12382204.1—Extended European Search Report dated Jan. 3, 2013, 7 pages.

*Primary Examiner* — Lindsay Low
*Assistant Examiner* — Long T Tran
(74) *Attorney, Agent, or Firm* — Edmonds & Nolte, PC

(57) ABSTRACT

An engine system and method for preheating a fuel for a cold startup of an IC engine are provided. The engine system may include an IC engine coupled to a source of fuel and configured to receive and combust a fuel from the source to rotate a shaft. The engine system may also include a heat exchanger fluidly coupled to the source of fuel and disposed upstream of the IC engine, and a preheat circuit. The preheat circuit may include a pump in fluid communication with the heat exchanger, a motor coupled to the pump and configured to drive the pump, and a preheater in fluid communication with the pump. The pump may be configured to pressurize a heat transfer medium and the preheater may be configured to preheat the heat transfer medium, the heat transfer medium being introduced to the heat exchanger to warm the fuel.

20 Claims, 2 Drawing Sheets

(56) References Cited

U.S. PATENT DOCUMENTS

| | | | |
|---|---|---|---|
| 5,218,944 A * | 6/1993 | Leonard | F02M 31/16 123/546 |
| 5,343,699 A * | 9/1994 | McAlister | 60/273 |
| 5,649,515 A | 7/1997 | Fuchs et al. | |
| 6,010,076 A * | 1/2000 | Winik | 237/12.3 B |
| 6,170,441 B1 * | 1/2001 | Haldeman | F02B 41/04 123/25 D |
| 6,298,834 B1 | 10/2001 | Thead et al. | |
| 6,371,094 B1 * | 4/2002 | Wagner | 123/576 |
| 6,837,225 B1 | 1/2005 | Fukuda | |
| 6,843,216 B2 * | 1/2005 | Suzuki | F01P 11/20 123/142.5 R |
| 6,851,416 B1 | 2/2005 | DeWitte et al. | |
| 7,225,998 B2 | 6/2007 | Pellizzari | |
| 7,313,916 B2 | 1/2008 | Pellizzari | |
| 7,350,514 B2 | 4/2008 | Stoddard | |
| 7,357,101 B2 | 4/2008 | Boyarski | |
| 7,395,786 B2 | 7/2008 | Leone et al. | |
| 7,530,335 B2 * | 5/2009 | Sakurai et al. | 123/3 |
| 7,819,092 B1 * | 10/2010 | Maul | F01N 5/02 123/25 B |
| 8,371,274 B2 | 2/2013 | Moessner | |
| 8,677,949 B2 | 3/2014 | Bromberg et al. | |
| 8,677,981 B2 * | 3/2014 | Pursifull et al. | 123/557 |
| 8,730,872 B2 | 5/2014 | Elmaleh | |
| 2001/0025631 A1 * | 10/2001 | Beekman | F02M 31/16 123/557 |
| 2005/0126551 A1 * | 6/2005 | Mello et al. | 123/549 |
| 2005/0279334 A1 * | 12/2005 | Lerner | F02M 31/10 123/557 |
| 2007/0283927 A1 * | 12/2007 | Fukumoto et al. | 123/445 |
| 2008/0110419 A1 * | 5/2008 | Sakurai | C01B 3/386 123/3 |
| 2009/0139472 A1 * | 6/2009 | Gehres | F01P 7/16 123/41.08 |
| 2010/0139627 A1 * | 6/2010 | Verhein | F02D 19/0605 123/553 |
| 2010/0139628 A1 * | 6/2010 | Pursifull | F02M 31/125 123/557 |
| 2011/0025631 A1 * | 2/2011 | Han | 345/173 |
| 2011/0259285 A1 | 10/2011 | Michikawauchi et al. | |
| 2011/0296849 A1 * | 12/2011 | Benson | 62/6 |
| 2012/0012085 A1 * | 1/2012 | Rowley et al. | 123/557 |

* cited by examiner

ETHANOL PREHEATER FOR ENGINE

BACKGROUND

This application claims priority to European Patent Application Serial No. 12382204.1, which was filed May 24, 2012. This priority application is hereby incorporated by reference in its entirety into the present application, to the extent that it is not inconsistent with the present application.

Internal combustion ("IC") engines are typically configured to combust fuels such as gas, diesel, natural gas, or the like to drive a shaft. Such engines may be employed in a variety of applications ranging from automotive to industrial power generation. Recently, there has been a renewed desire in developing alcohol-fueled IC engines, specifically ethanol engines, owing to environmental and cost needs, along with a desire to reduce dependency on traditional fossil fuels. However, such alcohol-fueled IC engines generally require the alcohol to be vaporized prior to or during combustion to provide efficient, complete combustion resulting in the requisite expansion forces on the piston. Generally, the IC engines utilize ambient temperatures and the engine heat itself to provide heat for such vaporization.

In environments with low ambient temperature, however, a cold-start of the IC engine presents challenges. The ambient air may provide insufficient levels of heat to vaporize the alcohol, while the engine itself provides essentially no additional heat until it begins running. Fuel preheaters for cold-start are generally known and used in, for example, the automotive industry for low temperature cold-starts. Such known designs, however, suffer from a variety of drawbacks, such as requiring direct heating of a large portion of the engine, direct contact between the fuel and the heating elements, and the like.

What is needed is a cold-start system and method for an alcohol engine that does not suffer from these drawbacks.

SUMMARY

Embodiments of the disclosure may provide a preheat circuit for an IC engine. The preheat circuit for an IC engine may include a pump fluidly coupled to a source of a heat transfer medium, and a preheater fluidly coupled to the pump and configured to warm the heat transfer medium received from the pump when a temperature of the heat transfer medium upstream from the preheater is indicative of a temperature of the IC engine being below a minimum engine temperature. The preheat circuit for an IC engine may also include a heat exchanger in fluid communication with a source of a fuel for the IC engine and the preheater, the heat exchanger being configured to receive the heat transfer medium from the preheater and transfer heat therefrom to the fuel.

Embodiments of the disclosure may further provide an engine system. The engine system may include an IC engine coupled to a source of fuel and configured to receive and combust a fuel from the source to rotate a shaft. The engine system may also include a heat exchanger fluidly coupled to the source of fuel and disposed upstream of the IC engine, and a preheat circuit. The preheat circuit may include a pump in fluid communication with the heat exchanger, a motor coupled to the pump and configured to drive the pump, and a preheater in fluid communication with the pump. The pump may be configured to pressurize a heat transfer medium and the preheater may be configured to preheat the heat transfer medium, the heat transfer medium being introduced to the heat exchanger to warm the fuel.

Embodiments of the disclosure may further provide a method for preheating a fuel for a cold startup of an IC engine. The method may include pumping a heat transfer medium to a preheater using a pump, and heating the heat transfer medium with the preheater. The method may also include warming the fuel with the heat transfer medium, and combusting the fuel in the IC engine. The method may further include powering off the pump, the preheater, or both when the heat transfer medium upstream from the preheater is above a minimum temperature.

BRIEF DESCRIPTION OF THE DRAWINGS

The present disclosure is best understood from the following detailed description when read with the accompanying FIG.ures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
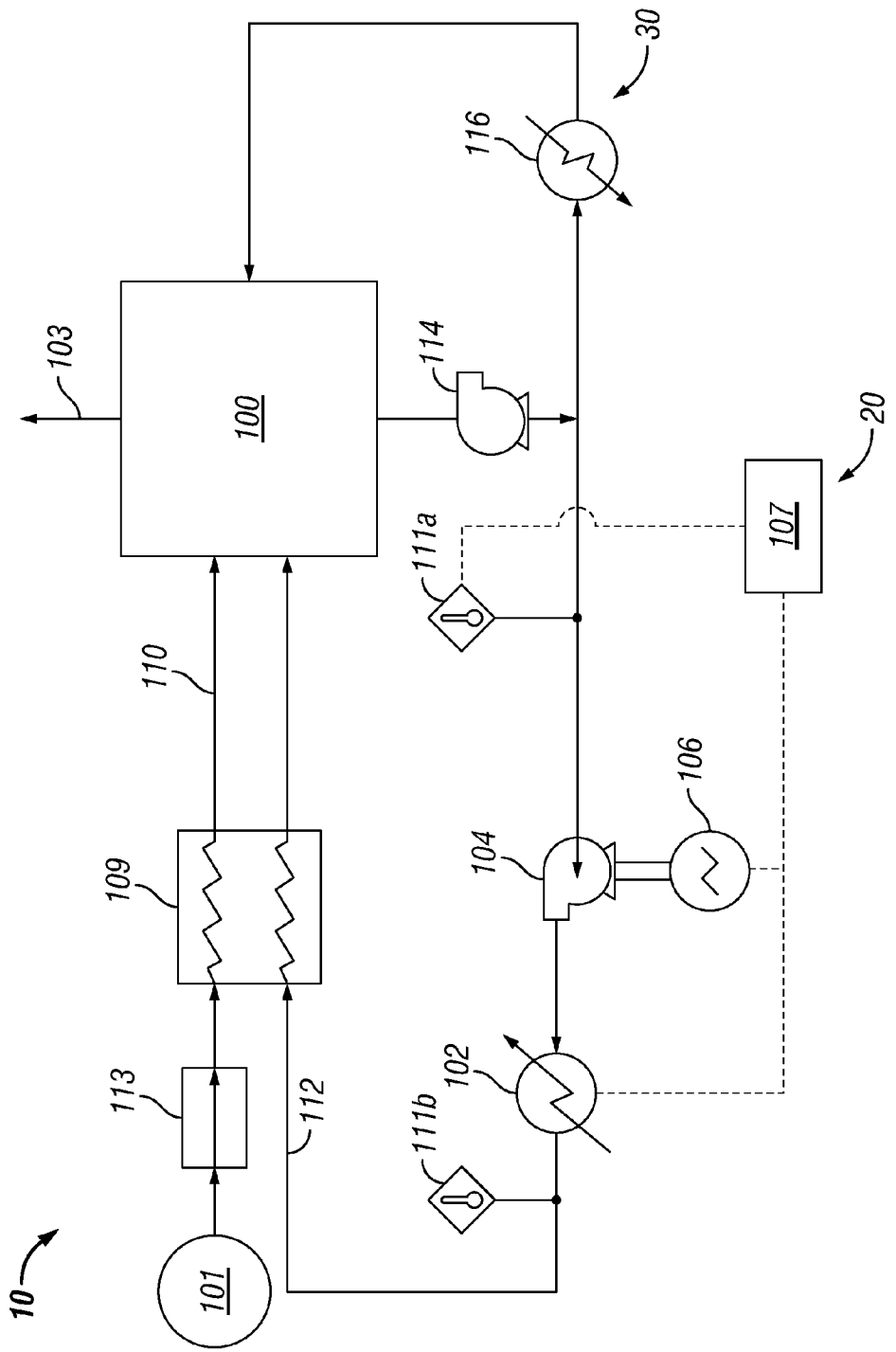
FIG. 1 illustrates a schematic of an exemplary IC engine system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the FIG.ures provided herein. This repetition is for the purpose of simplicity and clarity and does not in itself dictate a relationship between the various exemplary embodiments and/or configurations discussed in the various FIG.ures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary IC engine system 10, according to an embodiment. The IC engine system 10 includes an IC engine 100 that may be suited for use with alcohol-type fuels, such as ethanol or a mixture of substantially ethanol and other fuels. In other embodiments, other fuels may be used. As it is used herein, "substantially ethanol" is generally defined to mean greater than 50 wt % ethanol. The IC engine 100 may be a piston-driven engine, a rotary engine, or any other suitable type of engine. The IC engine 100 is coupled to a source of fuel 101, so as to receive and combust the fuel, thereby providing useful mechanical energy (e.g., shaft rotation). Exhaust products may be vented via line 103 after any appropriate heat recovery and/or environmental protection processes, for example. A variety of different types and designs of IC engines are known and may be used without departing from the scope of the present disclosure.

For cold-startup (i.e., where the IC engine 100 is off and cooled to at or near ambient conditions) in low ambient temperature environments, the IC engine system 10 includes a preheat circuit 20 configured to warm incoming fuel using a heat transfer medium received from a source. "Low ambient temperature environments" are generally defined herein to include environments having temperatures of less than about 20° C., less than about 15° C., or less than about 10° C. The preheat circuit 20 generally includes a preheater 102, which may include an electrical resistance heating element that uses, for example, 1 kW of power at 480 V. In other embodiments, the preheater 102 may be a gas heater, alcohol heater, solar heater, geothermal heater, combinations thereof, or the like. Additionally, the preheater 102 may employ heat stored by the IC engine system 10 during previous cycles of the IC engine 100.

The preheat circuit 20 also includes a pump 104 fluidly coupled to the preheater 102. The pump 104 may be any suitable pump, driven by any suitable device or method. In an exemplary embodiment, the pump 104 may be driven by a motor 106, which may be an electric motor, as shown. The motor 106 which may receive electric power from a generator (not shown), power grid (not shown), or any other source. For example, the motor 106 may operate using 1 kW of power from a 480 V source. In other embodiments, the pump 104 may be hydraulically driven, such as by a turbine (not shown).

The IC engine system 10 also includes a heat exchanger 109, which may also form part of the preheat circuit 20. Further, the heat exchanger 109 may form part of a "jacket" for the fuel line 110 proceeding toward the IC engine 100. The heat exchanger 109 may include an interior conduit therein (not shown), which receives the fuel therein from the source 101 via line 110. As shown, the heat exchanger 109 may be fluidly coupled to the source 101 via a nozzle 113 or other misting device. For example, the heat exchanger 109 may serve as a receptacle for the fuel after it has progressed through the nozzle 113. In other embodiments, such misting or atomization can take place downstream from the heat exchanger 109, such that the heat exchanger 109 receives a laminar or turbulent flow of fuel. In either case, after proceeding through the heat exchanger 109, the fuel may be introduced to the IC engine 100 for combustion and power generation.

In another embodiment, the IC engine 100 may include a fuel pump, configured to pressurize the fuel from the source 101. The fuel pump may be fluidly coupled to the source 101 and disposed upstream from the heat exchanger 109, according to an exemplary embodiment. In yet another embodiment, the fuel pump may be disposed upstream of the nozzle 113 and may fluidly couple the source 101 and the nozzle 113.

The heat exchanger 109 also receives a heat transfer medium from the preheater 102 via line 112. For example, the heat exchanger 109 may include one or more chambers or flowpaths therein which are prevented from fluid communication with the interior of the heat exchanger 109, thereby preventing mixing of the heat transfer medium and the fuel. The heat exchanger 109 may thus act as a shell-and-tube heat exchanger, warming the fuel through the heat exchanger 109. In other embodiments, the heat exchanger 109 may be a plate-and-fin heat exchanger, cross-flow heat exchanger, printed circuit heat exchanger (PCHX), combinations thereof, and/or any other type of heat exchanger.

The heat transfer medium fed to the heat exchanger 109 may be water, substantially water (i.e., greater than 50 wt % water), or water-based. For example, as shown, the heat transfer medium may be water that is used during normal operation of the IC engine 100 (i.e., when the IC engine 100 no longer requires preheating of the fuel) in a cooling system 30 configured to cool the IC engine 100 components. In an exemplary embodiment, the cooling system 30 may include a pump 114 and a radiator 116; however, any cooling system 30 may be employed. Further, the preheat circuit 20 may be joined with the cooling system 30, so as to receive the heat transfer medium therefrom, but in other embodiments the preheat circuit 20 and the cooling system 30 may form discrete, non-connected loops or systems. In various embodiments, the heat transfer medium in the preheat circuit 20 and/or in the cooling system 30 may be a refrigerant (e.g., an HCFC, R134a, etc.), an organic refrigerant, carbon dioxide, argon, nitrogen, hydrogen, air, or the like.

The preheat circuit 20 may also include one or more temperature sensors 111a,b configured to measure the temperature of the heat transfer medium. The temperature sensors 111a,b may each be or include a thermocouple, thermostat, thermistor, thermometer, or any other suitable temperature-probe or sensing device. The temperature sensor 111a may be configured to determine (i.e., provide an output related to) the temperature of the heat transfer medium, prior to its introduction to the preheater 102. For example, the temperature sensor 111a may be disposed upstream of the pump 104, as shown, but may also be disposed between the pump 104 and the preheater 102, or between the IC engine 100 and the pump 114. The temperature sensor 111b may be disposed downstream from the preheater 102 and may be configured to determine the temperature of the heat transfer medium after preheating in the preheater 102. This secondary temperature sensor 111b may be omitted in various embodiments, or may be used as an input for controlling the speed of the pump 104.

The preheat circuit 20 may also include a controller 107. The controller 107 may be or include one or more programmable logic controllers and may be configured to receive a signal from the temperature sensor 111a,b. The controller 107 may also be coupled to the motor 106 and/or the preheater 102. The controller 107 may be operable to determine the temperature of the heat transfer medium upstream from the preheater 102 based on the signal from the temperature sensor 111a. According to this determination, the controller 107 may power off the pump 104 (e.g., by powering off the motor 106) and/or power off the preheater 102. The controller 107 may also be operable to determine the temperature of the heat transfer medium downstream from the preheater 102, based on the signal from the temperature sensor 111b. The controller 107 may employ this information to control the speed of the pump 104 or the rate of heat input in the preheater 102.

In exemplary operation, during low-ambient temperature cold-startup, the motor 106 (and thus the pump 104) and the preheater 102 may be powered on, for example, prior to starting the IC engine 100. Accordingly, the motor 106 drives the pump 104, which pushes the heat transfer medium through the preheat circuit 20. The heat transfer medium may thus course through the preheater 102, which raises the temperature of the heat transfer medium to above ambient. For example, in instances where the heat transfer medium is received from the cooling system 30, during cold-startup, the heat transfer medium is initially at or near the internal temperature of the IC engine 100. In low ambient temperature conditions, the internal temperature of the IC engine 100, and thus the heat transfer medium initial temperature, may be less than about 10° C. The temperature of the heat transfer medium downstream from the preheater 102 may be from about 20° C. to about 90° C., for example, about 35° C. In other embodiments, the temperature of the heat transfer medium may be substantially higher, for example, about 65° C.

The temperature sensor 111a measures the temperature of the heat transfer medium upstream from the preheater 102 and relays this information to the controller 107. When the controller 107 detects that the temperature of the heat transfer medium is below a minimum temperature, the controller 107 powers on, or at least does not power down, the pump 104 and the preheater 102. After being warmed in the preheater 102, the heat transfer medium is directed to the heat exchanger 109. In the heat exchanger 109, thermal energy is withdrawn from the heat transfer medium and received by the fuel from the source 101, which may at least partially vaporize the fuel. Accordingly, the warmed fuel may be directed from the heat exchanger 109 to the IC engine 100 for combustion, for example, via a fuel injector. The temperature of the fuel downstream from the heat exchanger 109, but upstream from combustion in the IC engine 100, may be between about 20° C. and about 75° C. In one specific embodiment, the temperature of the fuel at this location may be about 35° C. In another specific embodiment, the temperature of the fuel at this location may be about 65° C.

When the IC engine 100 components warm to a point where the heat resulting from the combustion of the fuel in the IC engine 100 is sufficient to provide the required vaporization of the fuel, the IC engine system 10 operates to stop the preheat circuit 20. For example, when the temperature sensor 111a reads above the desired minimum temperature, it indicates that heat is being carried out of the IC engine 100 by the heat transfer medium. Thus, the IC engine system 100 no longer requires heat input by the preheater 102. Accordingly, when the controller 107 detects that the temperature read by the temperature sensor 111a is above the required minimum, the controller 107 may act to power down the pump 104 and/or preheater 102. In other embodiments, the pump 104 and/or preheater 102 may be manually shut off.

Figure 2:
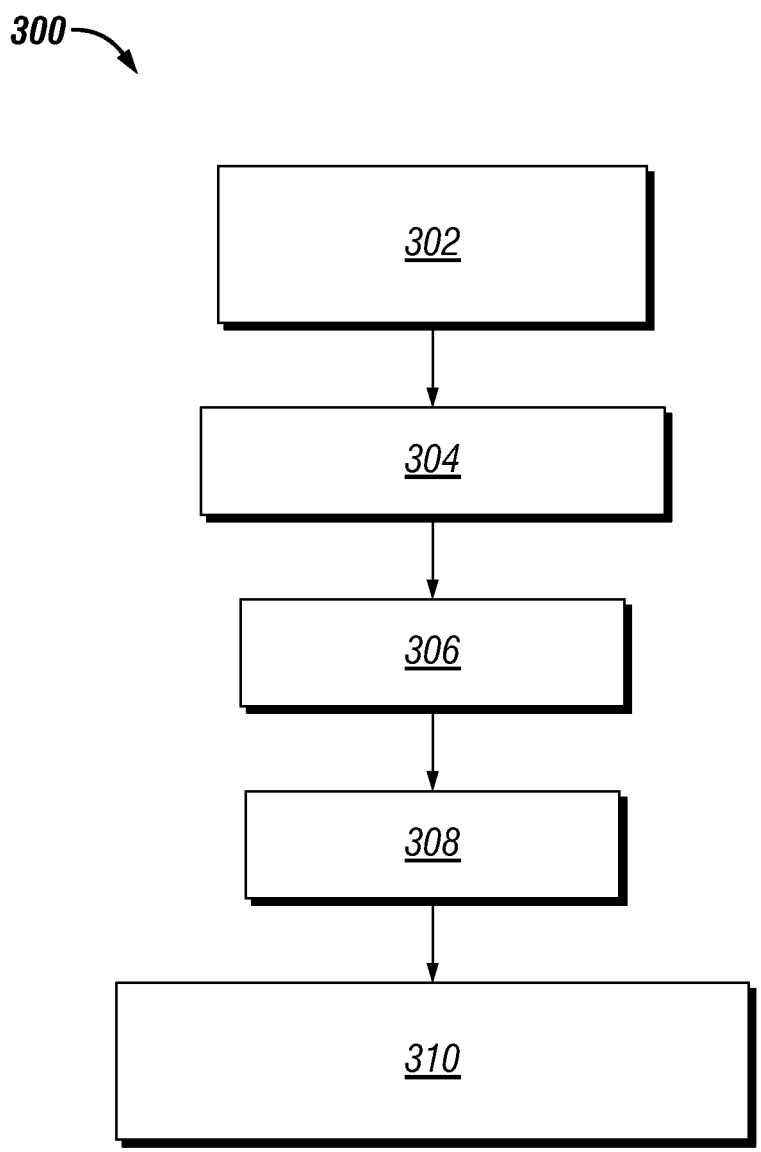
FIG. 2 illustrates a flowchart of an exemplary method for preheating a fuel for a cold-startup of an IC engine system, according to an embodiment.

FIG. 2 illustrates a flowchart of a method 300 for preheating fuel for a cold-startup of an IC engine, according to an embodiment. The method 300 may proceed by operation of one or more of the embodiments of the IC engine system 10 described above with reference to FIG. 1. Accordingly, the method 300 may be best understood with reference thereto.

The method 300 includes pumping a heat transfer medium to a preheater using a pump, as at 302. In the preheater, the heat transfer medium is heated by one or more heating elements (e.g., resistive heaters) of the preheater, as at 304. The method 300 may then proceed to warming the fuel with the heat transfer medium, as at 306. For example, the heat transfer medium may be fed to a heat exchanger, which may be a jacket configured to receive atomized or otherwise misted fuel from a nozzle and upstream of the IC engine. Thereafter, the method 300 may proceed to combusting the fuel in the IC engine, as at 308. Once the IC engine is capable of providing heat to vaporize the fuel, the preheater may no longer be required. Accordingly, the method 300 may include powering off the pump, the preheater, or both when the heat transfer medium upstream from the preheater is above a minimum temperature, as at 310.

In an exemplary embodiment, the method 300 may also include receiving the heat transfer medium in the pump from a cooling system fluidly coupled to the IC engine. The cooling system may be a conventional water cooling system and may thus include a pump and a radiator (and/or another device for heat rejection) for maintaining safe and efficient temperatures in the IC engine during normal operation. Additionally, the method 300 may include measuring the temperature of the heat transfer medium between the pump and the IC engine. Measuring the temperature at this location may provide information about the internal temperature of the IC engine, providing an indication of whether the IC engine is still in cold startup or is at or about to be in normal operation.

The method 300 may also include starting the IC engine in an ambient temperature of less than about 10° C. Furthermore, the fuel used by the IC engine in the method 300 may be ethanol or substantially ethanol, with warming the fuel at 306 specifically including warming the fuel to at least about 35° C., in at least one embodiment, among the many contemplated herein.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A preheat circuit for an IC engine, comprising:
   a pump fluidly coupled to a source of a heat transfer medium;
   a preheater disposed downstream from and fluidly coupled to the pump, the preheater being configured to warm the heat transfer medium received from the pump when a temperature of the heat transfer medium upstream from the preheater is indicative of a temperature of the IC engine being below a minimum engine temperature; and
   a heat exchanger comprising a fuel conduit extending therethrough and configured to transport fuel from a fuel source to the IC engine, the heat exchanger in fluid communication with the preheater and configured to receive the heat transfer medium from the preheater and transfer heat therefrom to the fuel in the fuel conduit.

2. The preheat circuit of claim 1, wherein the source of the heat transfer medium is a cooling system for cooling the IC engine during normal operation.

3. The preheat circuit of claim 1, further comprising:
   a temperature sensor configured to provide a signal indicative of the temperature of the heat transfer medium upstream from the preheater; and a controller configured to receive the signal from the temperature sensor, to power on the pump and the preheater when the temperature of the heat transfer medium upstream from the preheater is below a minimum heat transfer medium temperature and to power down the pump, the preheater, or both when the temperature of the heat transfer medium upstream from the preheater is above the minimum heat transfer medium temperature.

4. The preheat circuit of claim 3, wherein the minimum heat transfer medium temperature is between 20° C. and 90° C.

5. The preheat circuit of claim 1, wherein the heat exchanger is configured to raise the fuel to a temperature of between 20° C. and 75° C.

6. The preheat circuit of claim 1, wherein the fuel is substantially ethanol.

7. An engine system, comprising:
an IC engine coupled to a source of fuel and configured to receive and combust a fuel from the source of fuel to rotate a shaft;
a heat exchanger comprising a fuel conduit extending therethrough and configured to transport the fuel from the source of fuel to the IC engine, the heat exchanger disposed upstream of the IC engine;
a preheat circuit including a pump in fluid communication with the heat exchanger, a motor coupled to the pump and configured to drive the pump, and a preheater disposed downstream from and in fluid communication with the pump, the pump being configured to pressurize a heat transfer medium and the preheater being configured to preheat the heat transfer medium received from the pump, the heat transfer medium being introduced to the heat exchanger to warm the fuel in the fuel conduit; and
a controller coupled to the motor and configured to power off the motor when a temperature of the IC engine is equal to or above a minimum temperature.

8. The engine system of claim 7, wherein the fuel is substantially ethanol.

9. The engine system of claim 8, further comprising a nozzle interposed between the heat exchanger and the IC engine, wherein the nozzle is configured to direct the fuel into a combustion chamber of the IC engine.

10. The engine system of claim 7, wherein the controller is configured to power on the motor to drive the pump when the temperature of the IC engine is below the minimum temperature.

11. The engine system of claim 10, further comprising a temperature sensor configured to sense a temperature of the heat transfer medium.

12. The engine system of claim 11, wherein the temperature sensor is disposed upstream of the pump such that the temperature of the heat transfer medium is related to the temperature of the IC engine.

13. The engine system of claim 11, wherein the controller is configured to receive a signal from the temperature sensor to determine whether the temperature of the heat transfer medium is above the minimum temperature.

14. The engine system of claim 12, wherein the controller is configured to power on the preheater when the temperature of the heat transfer medium is below the minimum temperature and to power off the preheater when the temperature of the heat transfer medium is above the minimum temperature.

15. The engine system of claim 10, wherein the minimum temperature is between 20° C. and 90° C.

16. The engine system of claim 7, wherein the motor and the pump are directly coupled to the preheater.

17. The engine system of claim 7, wherein the heat exchanger is configured to heat the fuel to at least 35° C.

18. A method for preheating a fuel for a cold startup of an IC engine, comprising:
pumping a heat transfer medium to a preheater using a pump, the preheater disposed downstream from and fluidly coupled with the pump;
heating the heat transfer medium with the preheater;
warming the fuel in a fuel conduit positioned within a heat exchanger with the heat transfer medium;
combusting the fuel in the IC engine; and
powering off the pump when the heat transfer medium upstream from the preheater is above a minimum temperature.

19. The method of claim 18, further comprising:
receiving the heat transfer medium in the pump from a cooling system fluidly coupled to the IC engine; and
measuring the temperature of the heat transfer medium between the pump and the IC engine.

20. The method of claim 18, further comprising starting the IC engine in an ambient temperature of less than about 10° C., wherein the fuel is ethanol, and warming the fuel comprises warming the fuel to at least 35° C.

* * * * *